United States Patent [19]

Stout, III

[11] Patent Number: 5,228,608

[45] Date of Patent: Jul. 20, 1993

[54] COMBINATION TIRE COVER AND ARTICLE CARRIER

[75] Inventor: Byron G. Stout, III, Wichita, Kans.

[73] Assignee: Majestak Creations, Inc., Wichita, Kans.

[21] Appl. No.: 763,998

[22] Filed: Sep. 23, 1991

Related U.S. Application Data

[63] Continuation of Ser. No. 349,805, May 8, 1989, Pat. No. Des. 328,052.

[51] Int. Cl.⁵ .................................................. B60R 9/00
[52] U.S. Cl. ........................... 224/42.13; 224/42.46 R; 224/42.2; 280/152.05; 296/37.3; D12/157; D12/202
[58] Field of Search ............... 224/42.12, 42.13, 42.14, 224/42.2, 42.03 A, 42.06, 42.07, 42.24, 42.43, 42.46 R, 42.46 B, 42.42; 280/762, 767, 769, 156, 152.05, 152.2, 152.3, 160; 296/37.2, 37.3, 136; 206/304-304.2; 150/166; D3/40; D12/153, 156, 157, 190, 202, 204, 213

[56] References Cited

U.S. PATENT DOCUMENTS

| | | | |
|---|---|---|---|
| D. 179,516 | 1/1957 | Kammeyer | D12/202 |
| 299,609 | 6/1884 | Wood | 224/42.43 X |
| 799,662 | 9/1905 | Nathan | 206/304.1 |
| 879,511 | 2/1908 | Bond | 224/42.14 |
| 926,195 | 6/1909 | Kallis et al. | 224/42.14 X |
| 1,027,806 | 5/1912 | Blake | 280/152.2 |
| 1,043,752 | 11/1912 | Bolz | 224/42.14 |
| 1,148,734 | 8/1915 | Wilson | 224/42.14 |
| 1,186,073 | 6/1916 | Brown et al. | 206/304 X |
| 1,209,427 | 12/1916 | Goldsworthy | 224/42.14 X |
| 1,355,042 | 10/1920 | Harwood | 206/304 |
| 1,421,050 | 6/1922 | Washington | 224/42.13 |
| 1,583,659 | 5/1926 | Clarke | 206/304 |
| 1,715,719 | 6/1929 | Shelton | 224/42.14 |
| 1,777,719 | 10/1930 | Duffus | 224/42.13 X |
| 1,885,020 | 10/1932 | Vernon | 224/42.2 X |
| 1,991,207 | 2/1935 | Hartel | 206/304.2 |
| 3,014,759 | 12/1961 | Bing | 224/42.46 B |
| 4,911,343 | 3/1990 | Lords et al. | 224/42.43 |

FOREIGN PATENT DOCUMENTS 0317675 8/1929 United Kingdom ............. 224/42.13

Primary Examiner—Charles E. Phillips
Assistant Examiner—Casey Jacyna
Attorney, Agent, or Firm—Edwin H. Crabtree

[57] ABSTRACT

A combination tire cover and article carrier wherein the combination includes a tire cover for receipt over a vehicle spare tire, wheel and the like and a carrier attached to the front of the tire cover for holding various types of articles. The article carrier is used for transporting and storing various items therein. The tire cover is contoured to fit over a top portion of the spare tire. An upper strap is attached to the upper front of the carrier and is looped over the top of an item stored therein and over the top of the tire cover and around an upper tire mounting bracket. The upper strap is than returned to a buckle attached to the front of the carrier where an end of the upper strap is tightened thereon. A lower strap is attached to the front of the carrier and is looped underneath the carrier and under the bottom of the spare tire where the lower strap is looped around a lower tire mounting bracket. The lower strap is than returned to a buckle attached to the lower front of the carrier where an end of the lower strap is tightened thereon. By placing various items in the carrier and tightening the upper and lower straps on the tire mounting brackets, the combination tire cover and carrier are held securely in place on the spare tire. When the straps are loosened, the item stored in the carrier can be quickly removed and the combination tire cover and carrier can be removed from the spare tire or left thereon until another item needs to be transported thereon.

12 Claims, 2 Drawing Sheets

COMBINATION TIRE COVER AND ARTICLE CARRIER

PENDING PATENT APPLICATION

This patent application is a continuation application of a design patent application filed on May 8, 1989, having Ser. No. 07/349,805, now U.S. Pat. No. 0,328,052 entitled "COMBINED SPARE TIRE COVER AND CAN CARRIER" by the subject inventor.

BACKGROUND OF INVENTION (a) Field of the Invention

This invention relates to a combination tire cover and a carrier used for storing and transporting items therein and more particularly, but not by way of limitation, to an article carrier attached to a spare tire cover wherein the spare tire cover is received on a vehicle spare tire and secured thereto.

(b) Discussion of Prior Art

Heretofore there have been a variety of vehicle tire covers and spare tire covers as disclosed in U.S. Pat. No. 1,461,021 to Bate; U.S. Pat. No. 1,696,009 to McCormick; U.S. Pat. No. 4,126,169 to Magnuson et al; and U.S. Pat. No. D179,516 to Kanneyer. Also a number of protective wheel covers, tire holders, and spare tire cover attachments have been patented and described in U.S. Pat. No. 3,709,519 to Burrows; U.S. Pat. No. 3,870,360 to Nichols; U.S. Pat. No. 4,117,963 to Luczynski; and U.S. Pat. No. D294,246 to Patrick III. Further there have been carriers for holding a spare gasoline tank on a vehicle spare tire as shown in U.S. Pat. No. 1,421,050 to Washington; and U.S. Pat. No. 4,911,343 to Lords et al. None of the above mentioned patents disclose the unique features and structure of the subject combination tire cover and article carrier as described herein for storing and transporting a variety of items used in camping, skiing, and other outdoor and off-highway activities.

SUMMARY OF THE INVENTION

In view of the foregoing, it is an object of the present invention to provide a combination tire cover and article carrier that can be quickly mounted on an exterior mounted spare tire so that a variety of items may be transported in the carrier thereby providing additional room in the vehicle for added passengers and other articles.

The subject combination tire cover and carrier includes a cover that is contoured for receipt over the top of various size spare tires and wheels. The article carrier is attached to the front of the spare tire cover. An upper strap is attached to the front of the carrier and is looped over the top of an item stored therein and over the top of the tire cover and around an upper tire mounting bracket. The upper strap is than returned to an upper buckle attached to the front of the carrier where an end of the upper strap is tightened thereon. A lower strap is attached to the front of the carrier and is looped underneath the carrier and under the bottom of the spare tire where the lower strap is looped around a lower tire mounting bracket. The lower strap is than returned to a lower buckle attached to the lower front of the carrier where an end of the lower strap is tightened thereon. By placing various items in the carrier and tightening the upper and lower straps on the spare tire mounting brackets, the spare tire cover and carrier are held securely in place on the spare tire. When the straps are loosened, the item stored in the carrier can be quickly removed and the combination tire cover and article carrier removed from the spare tire and stored. Also the combination cover and carrier can be left on the spare tire, if desired, until another item needs to be transported.

These and other objects of the present invention will become apparent to those skilled in the art from the following detailed description, showing the contemplated novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DESCRIPTION OF THE PREFERRED EMBODIMENTS

Figure 1:
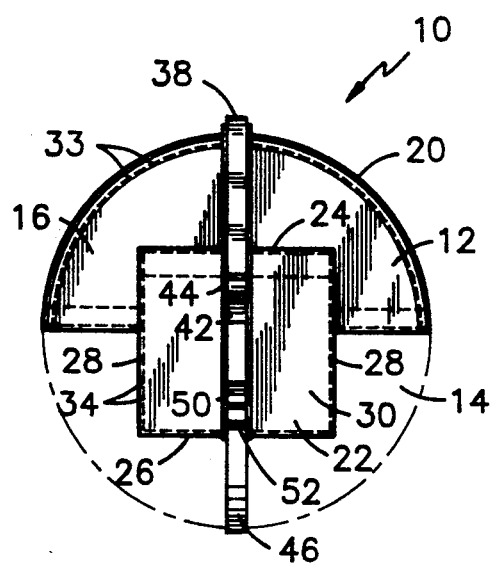
FIG. 1 and FIG. 2 are front and rear views of the subject combination tire cover and article carrier shown mounted on a vehicle spare tire shown in dotted lines.
Figure 2:
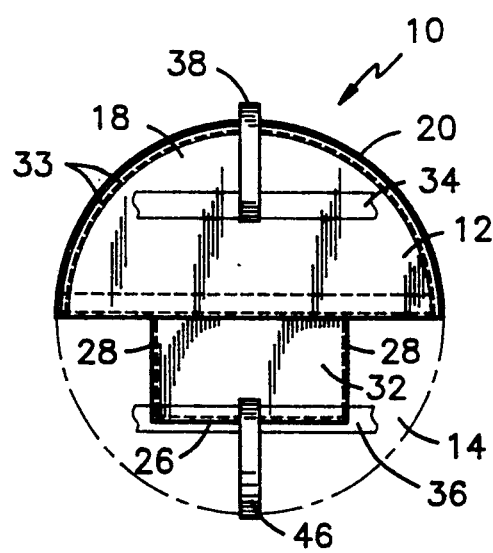

In FIG. 1 and FIG. 2 the subject combination tire cover and carrier is shown in a front and rear view and is designated by general reference numeral 10. The combination cover and carrier 10 includes a contoured semi-circular cover 12 adapted for receipt over the top of a spare tire 14 shown in dotted lines. The cover 12 includes a front portion 16, a rear portion 18, and a top portion 20 which is slightly wider than the width of the tire 14, so that when the cover 12 is received over the top of the tire 14, it is held therearound in a snug fit. The front and rear portions 16 and 18 are substantially cut in a half moon or semi-circular shape, so that the cover 12 is received over and around the upper half of the spare tire 14 and held securely thereon. While the spare tire 14 is discussed herein, it should be kept in mind that the combination cover and carrier 10 will work equally well with various size wheels and other circular mounting brackets and objects.

Attached to a lower front of the front portion 16 of the cover 14 is an article carrier 22. In FIG. 1 the carrier 22 is shown with an open top 24, a bottom 26, a pair of sides 28, a front 30, and a back 32.

The carrier 22 and the spare tire cover 12 are made of a flexible material which is sewn together as shown in the drawings with dotted lines 33.

Shown in FIG. 2 is a portion of an upper mounting bracket 34 and a lower mounting bracket 36, which is used for securing the spare tire 14 to a vehicle.

Figures 3, 4:
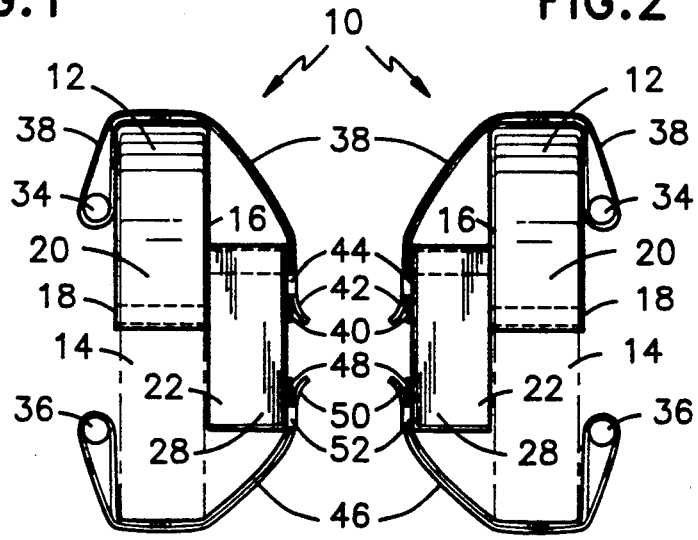
FIG. 3 and FIG. 4 illustrate a first and second side view of the combination tire cover and article carrier with an upper and lower strap looped around an upper and lower tire mounting bracket. The brackets are used in securing the spare tire to a vehicle. The vehicle is not shown in the drawings.

An upper strap 38 is attached at a first end 40, shown is FIGS. 3 and 4, to the upper front of the front 30 of the carrier 22. The strap 38 is looped over the top of the open top 24 of the carrier 22, looped over the top portion 20 of the cover 12, and looped around a portion of the upper mounting bracket 34 as seen in FIGS. 1-5. The strap 38 is than returned over the top of the top portion 20 of the cover 12 and the open top 24 where a second end 42 is attached to an upper buckle 44. By tightening the strap 38 on the buckle 44, the upper part of the carrier 22 and the cover 12 are held securely on the spare tire 14.

A lower strap 46 has a first end 48 attached to the lower front of the front 30 of the carrier 22. The first end 48 is seen in FIGS. 3 and 4. The lower strap 46 is looped underneath the bottom of the spare tire 14 and looped around a portion of the lower mounting bracket 36. The lower strap 46 is than returned underneath the tire 14 and a second end 50 of the strap 46 is attached to a lower buckle 52. By tightening the strap 46 on the buckle 52, the lower portion of the carrier 22 is prevented from bouncing and moving against the spare tire 14, and any article stored and transported in the carrier 22 is held securely in place.

In FIGS. 3 and 4 the combination tire cover and carrier 10 can be seen in opposite side views. In these figures the upper and lower straps 38 and 46 can be seen looped around the upper and lower mounting brackets 34 and 36 of the spare tire 14 and returned and tightened on the buckles 44 and 52.

Figure 5:
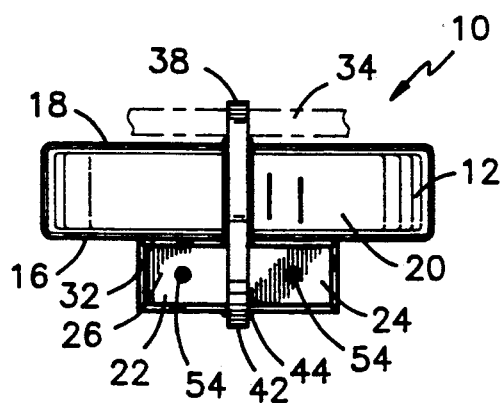
FIG. 5 and FIG. 6 are top and bottom views of the combination tire cover and carrier with drain holes shown in the bottom of the carrier to allow rain water or any other moisture or liquid to quickly drain away from the bottom of the carrier.
Figure 6:
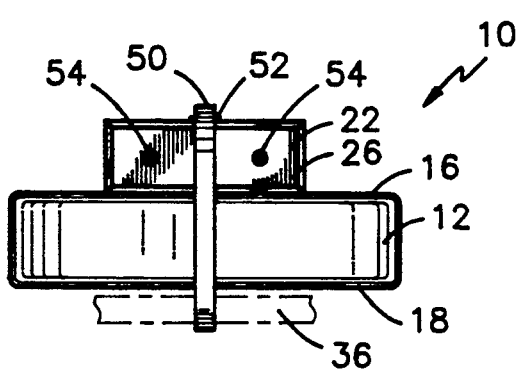

In FIGS. 5 and 6 the spare tire cover and carrier 10 is shown is a top and bottom view. In this view the carrier 22 can be seen with a pair of drain holes 54 in the bottom 26. The drain holes 54 allow any rain water or liquid, collected therein during storage or while transporting, to be quickly removed so that moisture does not collect and remain in the bottom of the carrier 22.

Figure 7:
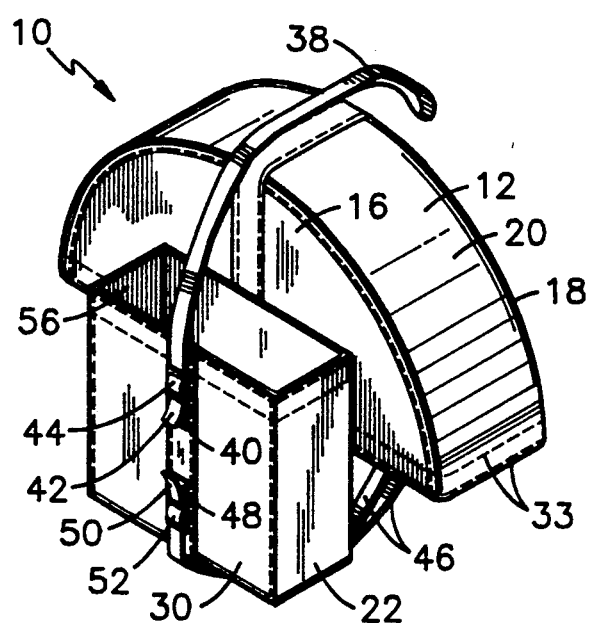
FIG. 7 is a perspective view of the combination tire cover and carrier.

In FIG. 7 a perspective view of the combination tire cover and carrier 10 is shown without the spare tire 14 and upper and lower mounting brackets 34 and 36.

While the invention has been particularly shown, described and illustrated in detail with reference to preferred embodiment, it should be understood by those skilled in the art that the foregoing and other modifications are exemplary only, and that equivalent changes in form and detail may be made therein without departing from the true spirit and scope of the invention as claimed, except as precluded by the prior art.

The embodiments of the invention for which an exclusive privilege and property right is claimed are defined as follows:

I claim:

1. A combination tire cover and article carrier for receipt on a vehicle spare tire, the spare tire having a periphery therearound, a front with an upper front portion and a lower front portion and a rear with an upper rear portion and a lower rear portion, the rear of the spare tire removably attached to a vehicle, the combination comprising:

a tire cover having a front portion, a rear portion, and periphery portion, said tire cover dimensioned for receipt over a portion of the spare tire's periphery and receipt over the upper front portion and upper rear portion of the spare tire said tire cover completely covering the portion of the spare tire's periphery and the upper front and the upper rear portions of the spare tire;

an article carrier having a top, a bottom, sides, a rear with an upper rear portion and a lower rear portion and a front with an upper front portion and a lower front portion, the upper rear portion of the rear of said carrier attached to the front portion of said tire cover, the lower rear portion the rear of said carrier disposed adjacent the lower front portion of the spare tire; and securing means attached to the front of said carrier for securing said tire cover to the spare tire and securing said carrier adjacent the lower front portion of the spare tire.

2. The combination as described in claim 1 wherein said securing means is an upper strap for securing said tire cover to the spare tire and a lower strap for securing said carrier adjacent the lower front portion of the spare tire.

3. The combination as described in claim 2 wherein said upper and lower straps further include buckles attached to the front of said carrier for receiving one end of said upper and lower straps.

4. The combination as described in claim 2 wherein the top of said article carrier is open and a portion of said upper strap is disposed above the open top of said carrier for helping hold therein an article received in the carrier.

5. The combination as described in claim 1 wherein the front and rear portion of said tire cover are formed in a semi-circular shape and said periphery portion is slightly wider than the width of the spare tire.

6. A combination tire cover and article carrier for receipt on a vehicle spare tire, the spare tire having a periphery therearound, a front with an upper front portion and a lower front portion and a rear with an upper rear portion and a lower rear portion, the rear of the spare tire removably attached to a vehicle, the combination comprising:

a tire cover having a front portion, a rear portion, and a periphery portion, said tire cover dimensioned for receipt over a portion of the spare tire's periphery and receipt over the upper front portion and upper rear portion of the spare tire, said tire cover made of a flexible material and dimension for receipt over the top of the periphery portion and around the upper front portion and the upper rear portion of the spare tire in a snug fit;

an article carrier having an open top, a bottom, sides, a rear with an upper rear portion and a lower rear portion and a front with an upper front portion and a lower front portion, the upper rear portion of the rear of said carrier attached to the front portion of said tire cover, the lower rear portion the rear of said carrier disposed adjacent the lower front portion of the spare tire; and securing means attached to the front of said carrier for securing said tire cover to the spare tire and securing said carrier adjacent the lower front portion of the spare time.

7. The combination as described in claim 6 wherein said means for securing is a plurality of elongated straps attached at one end to a front of said carrier and a plurality of buckles attached to the front of said carrier for receiving an opposite end of said straps.

8. The combination as described in claim 6 wherein said securing means is an upper strap looped over the top of said carrier and over a portion of the periphery portion of said tire cover and around a portion of a spare tire mounting bracket secured to the vehicle, said upper strap securing said tire cover to the spare tire and a lower strap looped under the bottom of said carrier and under a portion of the periphery of the spare tire and around a portion of the spare tire mounting bracket, said lower strap securing said carrier adjacent the lower front portion of the spare tire.

9. A combination tire cover and article carrier for receipt on a vehicle spare tire, the spare tire having a periphery therearound, a front with an upper front portion and a lower front portion and a rear with an upper rear portion and a lower rear portion, the rear of the spare tire removably attached to an upper mounting bracket and a lower mounting bracket, the brackets secured to a vehicle, the combination comprising:

a semi-circular tire cover having a front portion, a rear portion, and a periphery portion, said tire cover dimensioned for receipt over a portion of the spare tire's periphery and receipt over the upper front portion and upper rear portion of the spare tire, said tire cover made of a flexible material and dimension for receipt over the top of the periphery portion and around the upper front portion and the upper rear portion of the spare tire in a snug fit;

an article carrier having an open top, a bottom, sides, a rear with an upper rear portion and a lower rear portion and a front with an upper front portion and a lower front portion, the upper rear portion of the rear of said carrier attached to the front portion of said tire cover, the lower rear portion the rear of said carrier disposed adjacent the lower front portion of the spare tire; and an upper strap attached at one end to the front of said carrier and looped over the top of said carrier and over a portion of the periphery portion of said tire cover and around a portion of the upper mounting bracket secured to the vehicle, said upper strap securing said tire cover to the spare tire and a lower strap attached at one end to the front of said carrier and looped under the bottom of said carrier and under a portion of the periphery of the spare tire and around a portion of the lower mounting bracket, said lower strap securing said carrier adjacent the lower front portion of the spare tire.

10. The combination as described in claim 9 wherein an opposite end of said upper strap when looped around the upper mounting bracket is looped back over the top of the periphery portion of said tire cover and over the top of said carrier and releasably attached to a buckle mounted on the front of the carrier.

11. The combination as described in claim 9 wherein an opposite end of said lower strap, when looped around the lower mounting bracket, is looped back under a portion of the periphery of the spare tire and under the bottom of said carrier and releasably attached to a buckle mounted on the front of the carrier.

12. The combination as described in claim 9 further including at least one drain hole disposed in the bottom of said article carrier.

* * * * *